Dec. 1, 1953 J. R. SNYDER ET AL 2,661,019
AUTOMATIC VENTING DRUM CAP AND VALVE ASSEMBLY
Filed April 27, 1950 2 Sheets-Sheet 1
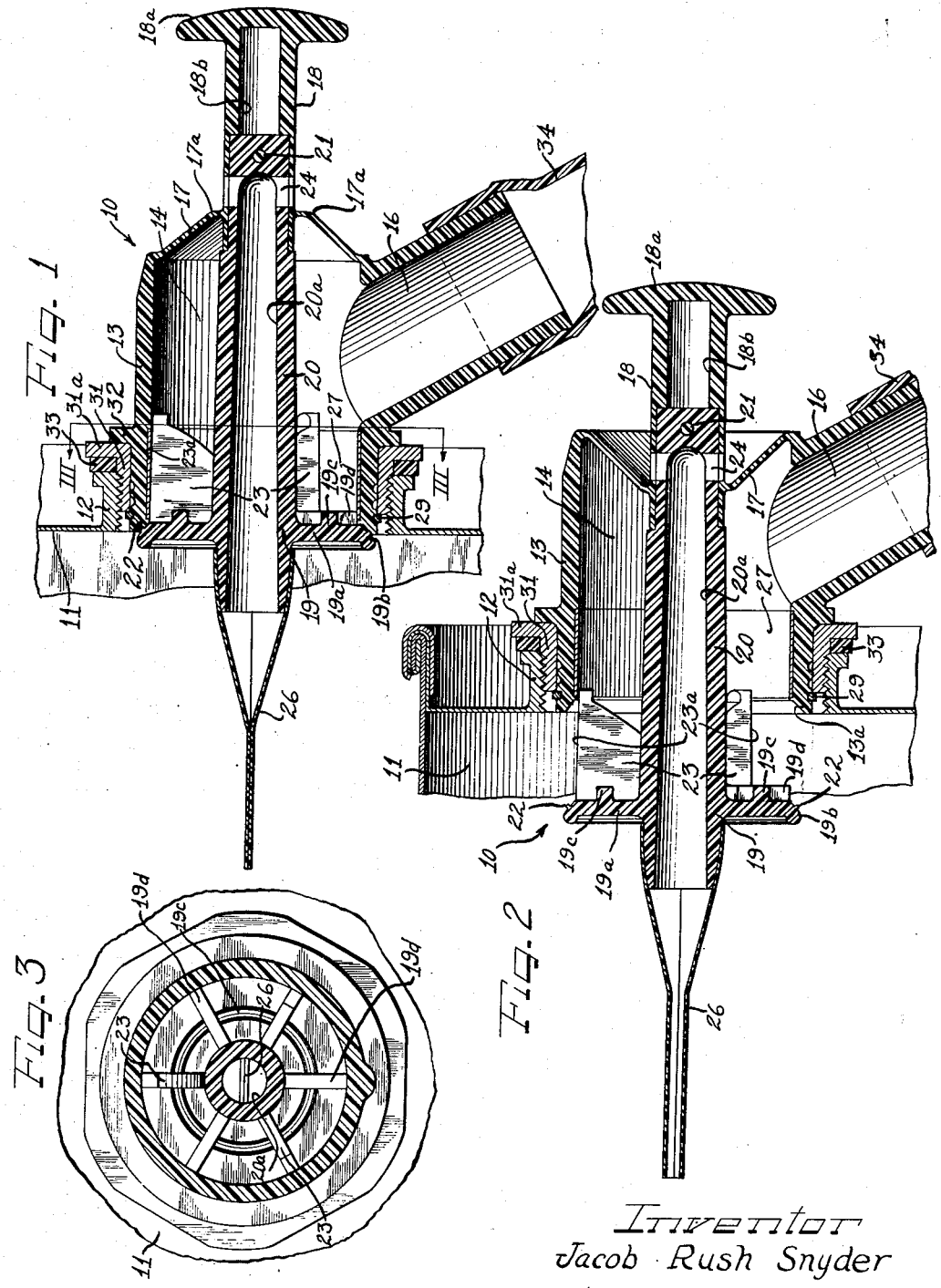
Inventor
Jacob Rush Snyder
Frank J. Schenkelberger
Attys Dec. 1, 1953  J. R. SNYDER ET AL  2,661,019
AUTOMATIC VENTING DRUM CAP AND VALVE ASSEMBLY
Filed April 27, 1950  2 Sheets-Sheet 2
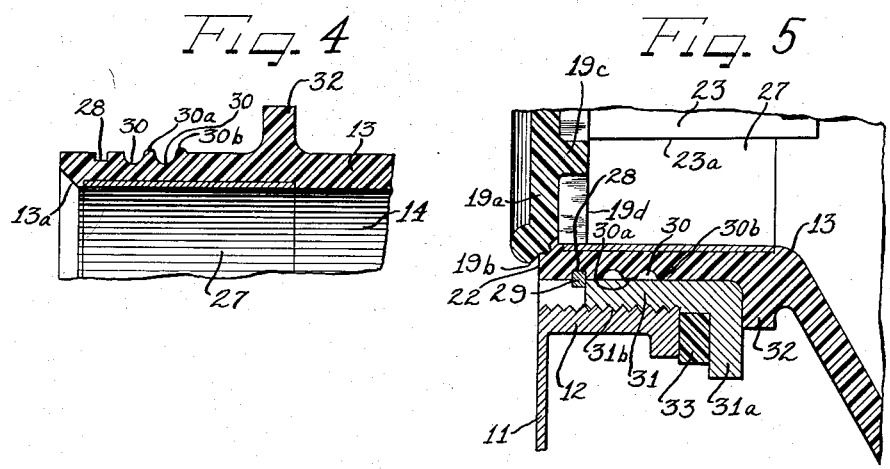
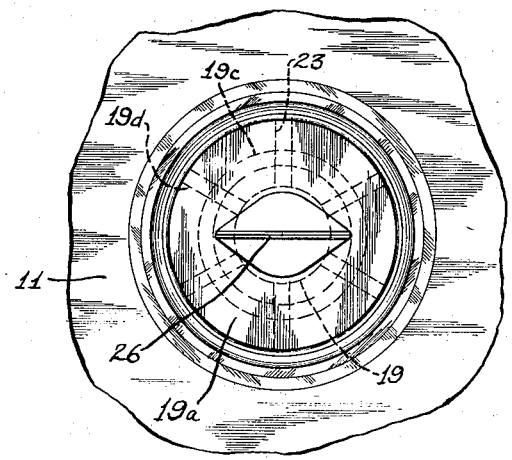
Inventor
Jacob Rush Snyder
Frank J. Schenkelberger
Attys Patented Dec. 1, 1953

2,661,019

UNITED STATES PATENT OFFICE 2,661,019

AUTOMATIC VENTING DRUM CAP AND VALVE ASSEMBLY

Jacob Rush Snyder and Frank J. Schenkelberger, Cleveland, Ohio, assignors to Thompson Products, Inc., Cleveland, Ohio, a corporation of Ohio Application April 27, 1950, Serial No. 158,562

8 Claims. (Cl. 137—594)

This invention relates generally to an automatic venting drum cap and valve assembly as is frequently used in connection with the decantation of fluids from a drum type closure having a drain valve opening therein.

More specifically, the present invention relates to a valved spigot having a one-piece molded synthetic plastic body equipped with an integral flexible diaphragm portion carrying an integral valve operating handle to which is secured a one-piece molded synthetic plastic vent tube and valve that is urged into seating engagement with the body by the inherent tendency of the diaphragm to move to an extended position.

The valve body, including the diaphragm and handle and the vent tube and valve unit, is preferably composed of polyolefinic thermoplastic resins such as polyethylene polybutene, polypropylene, polystyrene, polyacrylate, polymethacrylate, polyvinylbutyl ether and the like, although any suitable solid inert polymer or resin can be used.

According to the principles of the present invention, a spigot structure is provided which includes a body portion made as an integral molding of a chemically inert plastic polymer such as polyethylene, and has a generally cylindrical branched body defining a flow passageway with a valve seat at one end and an outlet spout intermediate the ends thereof. A flexible thinwalled diaphragm bonnet portion closes the other end of the passageway and carries an integral handle or stem for attachment to a separate vent tube and valve also made of a molded chemically inert polymer such as polyethylene, the valve normally closing the valve seat end of the passageway.

The diaphragm bonnet in its free position is bowed outwardly from the end of the body but can be depressed into the body. As it approaches its free bowed position it tends to snap or spring to its full bow, and this action is used to hold the stem mounted valve in a closed position against the open end of the body. When the handle or stem is pushed to depress the diaphragm, the valve will be moved away from its seat to allow flow through the passageway and spout. The valve has a deformable bead thereon to insure seating on its seat. The vent tube of the valve extends through the valve and communicates with an open port outside of the diaphragm to define a venting passageway connecting the inside of the drum closure with the atmosphere, thereby bleeding air into the drum to allow free flow of liquid from the drum.

A check valve on the vent tube controls the venting passageway to preclude egress of fluid from the closure outwardly through the venting passageway. The check valve may conveniently comprise a collapsible sleeve, also made of the same material as the body and valve and which is attached to the inner end of the vent tube.

In order to adapt the spigot structure described for installation into the drain valve opening of a drum type closure, a bung bushing ring is provided which preferably is formed from a corrosion-resistant metal such as stainless steel and constructed to be fitted over the cylindrical end of the spigot. A reinforcing ring also made of corrosion-resistant metal such as stainless steel or the like is preferably molded in the valve seat end of the body to underlie the bung bushing ring in order to impart rigidity to the spigot structure and minimize distortion of the valve seat.

It is therefore an object of the present invention to provide a valve-controlled spigot composed of a one-piece molded plastic body having an integral flexible diaphragm operatively carrying a valve controlling flow through the body.

A general object of the invention is to provide a molded plastic valve body with an integral molded flexible diaphragm forming a bonnet for the body.

Another object of the present invention is to provide a spigot structure for a decantation apparatus which includes a molded one-piece body with a valve seat at one end and an integral thin-wall diaphragm portion at the other end connected to a valve coacting with the seat.

A further object of the present invention is to provide an integral molded body for a spigot structure provided with thin deflectable bead portions adapted to establish a sealing relationship when the body is cooperatively assembled with metal drum cap accessories.

Many other features, advantages and additional objects of the present invention will become manifest to those versed in the art upon making reference to the detail description which follows and the accompanying sheets of drawings in which a preferred embodiment of a drum valve assembly according to the present invention is shown.

On the drawings:

Figure 1 is a cross-sectional view of a valve assembly according to the present invention assembled in the drain valve opening of a drum type closure and shown with the valve components in a closed seated position;

Figure 2 is a cross-sectional view of a valve assembly shown in Figure 1 but with the components of the valve assembly repositioned in a flow position;

Figure 3 is a fragmentary cross-sectional view with parts shown in elevation taken on line III—III of Figure 1;

Figure 4 is an enlarged fragmentary cross-sectional view of a portion of the inlet end of the spigot structure embodied in the assembly of the present invention;

Figure 5 is an enlarged fragmentary cross-sectional view of the valve assembly components in the locale of the drain valve opening of a closure showing additional details of construction; and Figure 6 is a fragmentary end elevational view of the valve assembly according to the present invention.

As shown on the drawings:

Referring generally to the drawings, the valve controlled spigot structure of this invention constructed to automatically bleed air into a drum or container from which a fluid is being drawn is shown as comprising a valve assembly indicated by the reference numeral 10 cooperatively related with an appropriate enclosure such as a drum or container 11 having the usual drain opening defined by an internally threaded bore formed in a boss 12. The valve assembly 10 includes a spigot body 13 which takes the form of an integral one-piece molded unit made of a chemically inert polymer such as polyethylene and which has a generally cylindrical branched body portion defining an open-ended passageway 14 with a hollow outlet spout 16 in association therewith.

A flexible thin-walled diaphragm bonnet portion 17 closes one end of the passageway 14 and has an integral central handle or stem 18 formed with a knob portion 18a on the outside of the diaphragm and a hollow stepped bore 18b extending from the knob through and beyond the diaphragm 17.

A separate valve 19 also made of the same chemically inert polymer is provided with a tubular stem 20 defining a venting passageway 20a which is telescopically receivable in the stepped bore 18b of the stem 18 and may be placed in firm assembly therewith by means of a pin 21.

The diaphragm 17 in its free state is generally bowed outward with its central portions beyond the rigid end of the body. The length of the stem 20 is selected to slightly deform the center of the diaphragm 17 even when the valve is fully seated, such deformation being indicated on Figure 1 by the reference character 17a, whereby the diaphragm 17 in seeking its normal free configuration will impart a seating thrust axially to the valve stem 20 thereby serving to retain the valve 19 in a seated position in the open end of the passageway 14.

The valve 19 includes a disk-like body 19a somewhat skived along its peripheral edges as at 19b to define a bevelled valve seating surface, the seating surface being particularly characterized by the formation of a relatively thin deformable annular bead 22 cooperable with a bevelled counterbore 13a forming a valve seat in the open terminal end of the passageway 14 to effect a sealproof closure of the open terminal end of the passageway 14 to control the flow of fluid therethrough.

An annular strengthening rib 19c is also formed on one face of the disk-like body 19a which, together with a plurality of spaced-apart radially extending ribs 19d, increases the rigidity of the valve structure.

The valve 19 is further provided with a plurality of enlarged guide wing flanges 23 having axially extending edge portions 23a slidably cooperable with the walls of the passageway 14 to radially align the valve 19 throughout the course of its traverse toward and away from a closed position when seated in the valve seat 13a.

It will be noted on the drawings that the stem 20 extends substantially through the body 18a of the valve 19 and the venting passageway 20a establishes venting communication between the inside of the container 11 and the atmosphere through an outlet port 24 formed through both the stem 18 and the stem 20 adjacent the outer face of the diaphragm 17.

A flapper type check valve 26 is mounted on the end of the stem 20 and preferably takes the form of a sleeve made of a flexible material with opposed flat wall portions and operates in a well known manner to permit one-way fluid flow of fluid through the venting passageway 20a. The check valve 26 may be conveniently fabricated from two pieces of a flat chemically inert plastic material, for example, polyethylene, and is thermally fused along its edge portions. As shown in Figure 1, the normally collapsed wall portions of the check valve 26 will close off the venting passageway 20a. However, if fluid is being taken from the closure 11, air will vent inwardly into the closure through the aperture 24, the venting passageway 20a and the check valve 26 (Figure 2).

Referring more specifically to Figures 4 and 5, a ring-like band 27 of corrosion-resistant metal such as stainless steel or the like is shown molded in the open terminal end of the passageway 14. The band 27 holds the body against unequal shrinkage and imparts advantageous strength characteristics to the open end of the spigot body 13. As shown on the drawings, the band 27 is spaced inwardly from the valve seat 13a so as to have no adverse effect upon the sealing characteristics of the valve assemblies but the band minimizes warping of the seat. The edges 23a of the guide wing flanges 23 will slidably engage the inside bore of the band 27.

Referring particularly to Figures 4 and 5, it will be noted that the body 13 of the spigot structure is of generally cylindrical configuration and is provided with several specific structural features which enhance the utility thereof.

An annular grooved recess 28 is provided on the external peripheral surface of the body 13 near the terminal end thereof to receive a snap ring 29, the purpose of which will become manifest presently.

A pair of annular recessed grooves 30 are also provided on the peripheral portion of the body 13 in spaced relationship to the snap ring seating groove 28 and are separated from one another by an annular deformable rib 30a, the outer diameter of which is slightly larger than the diameter of the generally cylindrical configuration defined by the body 13. Moreover, the innermost of the grooves 30 is bounded by a second annular deformable rib 30b which is of the same outer diameter as the rib 30a.

Deformation of the ribs 30a and 30b displaces a volume of material into the grooves 30 and efficiently seals against a bushing ring 31 preferably made of a corrosion-resistant metal such as stainless steel or the like snugly engaging the outer peripheral area of the body 13 near the open end thereof and retained thereon by the snap ring 29 received by the snap ring seating groove 28.

The body 13 is provided with an annular shoulder 32 against which a flange 31a defined by the bushing ring 31 may abut. An externally threaded portion 31b formed on the bushing ring 31 permits threaded assembly of the entire spigot structure in the internally threaded bore formed in the boss 12 in the locale of the drain hole of the closure 11.

An annular sealing gasket 33, which may also be made from a chemically inert plastic material such as polyethylene, may be inserted between the flange of the bushing ring 31 and the boss 12 to effect a seal between the closure 11 and the bushing ring 31.

The rigidity imparted to the spigot structure by the insert band 27 insures that the bushing ring 31 will be concentrically aligned relative thereto and the deformable ribs 30a and 30b will effect a positive sealing action on the inside bore walls of the bushing ring 31 if such bore is selected to have substantially the same diameter as the cylindrical portion of the body 13, nevertheless, the body 13 of the spigot structure may be rotated within the bushing ring 31 if repositioning of the nozzle 16 relative to the drain opening of the closure 11 is necessary or desirable.

In operation, the valve 19 will normally be retained in a closed position by virtue of the axial thrust imparted to the valve stem 20 by the diaphragm 17. Thus, the spigot structure 13, when equipped with a bushing ring 31, may be readily inserted within the drain opening of a closure 11 and selectively actuated whenever decantation of fluid from the closure is required.

To initiate flow outwardly from the closure, the knob 18a is thrust inwardly, thereby reciprocating the stem 20 so as to move the valve 19 away from the valve seat 13a. Fluid will then flow from the closure 11 through the fluid passageway 14 and through the spout 16 into a conduit 34 which may be conveniently connected thereto.

When the diaphragm 17 is depressed into the spigot body, as shown in Figure 2, the valve will be retained in a flow position with the valve spaced from its seat. Hence, no special holding means need be provided to maintain the valve in open position.

The guide wing flanges not only slidably engage the insert band 27 and the walls of the fluid passageway 14 but position the valve 19 when it is moved forwardly to the flow position so that the valve 19 may be readily retracted when flow through the passageway 14 is to be cut off.

Various modifications of the preferred structural embodiment herein shown by way of descriptive example might occur to those versed in the art, and it should be clearly understood that we do not propose to be limited to the precise details herein referred to for the sake of clarity but wish to embody within the scope of this invention all such modifications as reasonably and properly come within the scope of our contribution to the art.

We claim as our invention:

1. In a molded plastic spigot structure, a body portion of generally cylindrical configuration having a passageway therethrough with an open terminal end defining a valve seat, a ring-like band in the open terminal end of the passageway to hold the body against unequal shrinkage, an annular recessed groove on the external peripheral surface of the body near the terminal end thereof to receive a snap-ring, an annular recessed groove on the peripheral portion of the body in spaced relationship to the snap-ring seating groove and separated therefrom by an annular deformable rib, the outer diameter of the annular deformable rib being slightly larger than the diameter of the generally cylindrical configuration of the body, a bushing ring snugly fitted on the body and arranged to sealingly engage the deformable rib, whereby deformation of the rib will displace a volume of material into the recessed groove and a snap-ring to retain the bushing ring on the body.

2. In a molded plastic spigot structure, a body portion of generally cylindrical configuration having a passageway therethrough with an open terminal end defining a valve seat, a ring-like band in the open terminal end of the passageway to hold the body against unequal shrinkage, an annular recessed groove on the external peripheral surface of the body near the terminal end thereof to receive a snap-ring, an annular recessed groove on the peripheral portion of the body in spaced relationship to the snap-ring seating groove and separated therefrom by an annular deformable rib, the outer diameter of the annular deformable rib being slightly larger than the diameter of the generally cylindrical configuration of the body, a bushing ring snugly fitted on the body and arranged to sealingly engage the deformable rib, whereby deformation of the rib will displace a volume of material into the recessed groove and a snap-ring to retain the bushing ring on the body, said bushing ring being provided with external threads, a drum closure having a drain opening adapted to receive the bushing ring and a gasket between the bushing ring and the drum closure, the body of the spigot structure being rotatable within the bushing ring to effect repositioning thereof without impairing the sealing characteristics of the assembly.

3. A valve comprising mated movable inner and outer valve parts including a seat providing member and a valve head providing member connected by an annular flexible diaphragm being movable from a cup-shaped outwardly projecting position to a cup-shaped inwardly projecting position to prescribe the range of relative movement between said parts and being flexibly movable to said positions on opposite sides of a mid position for exerting a retaining force to hold said parts in open or closed end positions.

4. In a drum closure device, a body member providing a fluid passageway having an inlet at one end and having an outlet, a valve selectively seating in said one end of said passageway to control said inlet and including a stem portion connected to said body member by a flexible diaphragm closing the other end of said passageway, said diaphragm being flexibly movable between outwardly and inwardly extending cup-shaped positions to prescribe the limits of movement of said valve and exerting stored energy in selected direction on opposite sides of a mid position to hold and retain said valve in either open or closed end positions between said outwardly and inwardly extending cup positions.

5. In a spigot structure having a passaged body providing a valve seat, a valve made of a chemically inert molded plastic polymer and having an annular deformable rib adapted to engage the valve seat deforming upon engagement to effect a fluid tight sealing on the valve seat, and an annular flexible diaphragm connecting said valve to said body and arranged to prescribe the range of relative movement between said parts, said diaphragm being flexibly movable to opposite sides of a mid position for exerting stored energy in selected direction on opposite sides of a mid position to hold and retain said valve in either open or closed end positions, said body and valve being more rigid than said diaphragm to localize flexing movements in the diaphragm as the valve is moved between opened and closed positions.

6. A valve comprising mated movable inner and outer valve parts including a seat providing member and a valve head providing member connected by an annular flexible diaphragm being movable from a cup-shaped outwardly projecting position to a cup-shaped inwardly projecting position to prescribe the range of relative movement between said parts and being flexibly movable to said positions on opposite sides of a mid position for exerting a retaining force to hold said parts in open or closed end positions and a handle portion connected to said valve and projecting outside of said valve parts in a manually accessible position to provide manual operating means for flexing the valve between said end positions.

7. In a drum closure device, a body member providing a fluid passageway having an inlet at one end and having an outlet, a valve selectively seating in said one end of said passageway to control said inlet and including a stem portion connected to said body member by a flexible diaphragm closing the other end of said passageway, said diaphragm prescribing the limits of movement of said valve and exerting stored energy in selected direction on opposite sides of a mid position to hold and retain said valve in either open or closed end position, said valve having a longitudinal passageway formed therein extending through said stem portion and providing a venting duct independent of the fluid passageway, and a pressure responsive check valve for said venting duct on the end of said valve to prevent drainage fluid from entering said venting duct.

8. In a drum closure device, a body member comprising a chemically inert molded plastic polymer and providing a fluid passageway having an inlet at one end and having an outlet, a valve comprising a chemically inert molded plastic polymer and selectively seating in said one end of said passageway to control said inlet, said valve including a stem portion connected to said body member by a thin-walled portion forming a flexible diaphragm closing the other end of said passageway, said diaphragm prescribing the limits of movement of said valve and exerting stored energy in selected direction on opposite sides of a mid position to hold and retain said valve in either open or closed end positions, said body and valve being more rigid than said diaphragm to localize flexing movement in the diaphragm as the valve is moved between opened and closed positions, and a rigid threaded ring carried by said body member and adapted to be threaded into a bung bushing to mount the drum closure device in the drain opening of a drum.

JACOB RUSH SNYDER.
FRANK J. SCHENKELBERGER.

References Cited in the file of this patent

UNITED STATES PATENTS

| Number | Name | Date |
|---|---|---|
| 278,597 | Prier | May 29, 1883 |
| 1,034,897 | Fusner | Aug. 6, 1912 |
| 1,579,140 | Philips | Mar. 30, 1926 |
| 2,401,391 | Vale | June 4, 1946 |
| 2,431,457 | Bondurant | Nov. 25, 1947 |

FOREIGN PATENTS

| Number | Country | Date |
|---|---|---|
| 505,438 | Germany | 1930 |
| 555,716 | Great Britain | 1943 |